United States Patent [19]

Rocks

[11] Patent Number: 4,882,771
[45] Date of Patent: Nov. 21, 1989

[54] SINGLE LASER OPTICAL COMMUNICATION SYSTEM AND METHOD

[75] Inventor: Manfred Rocks, Berlin, Fed. Rep. of Germany

[73] Assignee: Krone Aktiengesellschaft, Berlin, Fed. Rep. of Germany

[21] Appl. No.: 184,290

[22] Filed: Apr. 21, 1988

[30] Foreign Application Priority Data

Apr. 21, 1987 [DE] Fed. Rep. of Germany ....... 3713340

[51] Int. Cl.$^4$ .............................................. H04B 9/00
[52] U.S. Cl. ..................... 455/605; 455/610; 455/606
[58] Field of Search ............... 455/605, 619, 610, 600, 455/617, 612, 606; 370/1, 3; 324/96; 356/349

[56] References Cited

U.S. PATENT DOCUMENTS 3,433,960 3/1969 Minott .................................. 455/605
4,777,661 10/1988 Spillman, Jr. ........................... 370/3

FOREIGN PATENT DOCUMENTS 2513049 3/1983 France ..................................... 370/1
0161834 7/1986 Japan ..................................... 455/605

Primary Examiner—Robert L. Griffin
Assistant Examiner—Andrew J. Telesz, Jr.

[57] ABSTRACT

The invention describes a method for optical communication of information between transmitter and receiver spatially separated from each other. The principle of heterodyne reception is utilized. A non-modulated optical carrier of a laser arranged on the receiving side is subdivided in a first fiber-optical coupler KE into two portions, the transmission path EMF and the local laser wave LL. In one branch, a displacement of frequency by the amount of Δf takes place. The non-modulated optical carrier passes through a one-mode fiber EMF in direction transmitting side and is modulated there with an effective signal in a modulator MOD (FIG. 1). This now modulated optical signal travels back to the receiving side, where it is converted with the local laser wave LL into an intermediate frequency band.

17 Claims, 2 Drawing Sheets

Transmitting Side          Receiving Side

SINGLE LASER OPTICAL COMMUNICATION SYSTEM AND METHOD

FIELD AND BACKGROUND OF THE INVENTION

The invention relates to communication systems and in particular to a new and useful method for optical communication of information.

The principle of one-laser heterodyne reception is known from optical measurement techniques.

In several publications, e.g. in "Electronics Letters" vol. 16 (1980) p. 630–631 or in "IEEE Journ. of Quantum Electronics" vol. 22 (1986) p. 2070–2074, this measurement principle is described. The objects are always to measure the spectral power density of the laser phase noise. The known measuring system is always installed at one place, e.g. in a laboratory.

Therefore, it is not suitable for communications of modulated optical signals between two positions spatially separated from each other.

SUMMARY OF THE INVENTION

The invention provides an optical communication system with heterodyne reception for communication of information between two positions far away from each other under application of one laser only.

The advantages resulting from the invention include; in particular the fact that by mixing a strong signal (local laser) with a weak modulated signal coming from the transmission path, the receiver sensitivity is increased due to the direct-reception principle, that on the transmitting side only passive optical components are used, that only one laser is used, and that the frequency regulation of the local laser by ZF voltage feedback is not necessary. This is because a present laser frequency drift takes place in identical sense for both the strong signal (local laser) and the weak modulated signal, only displaced in time by the signal travel time through the one-mode fiber. As such a frequency drift results due to mainly thermal reasons, it is slow for a well temperature-stabilized laser, such that the difference in travel time will not count for disturbances.

Further, it is advantageous that a frequency adjustment of different lasers is not required and that the adjustment of the intermediate frequency is effected not over the laser, being very sensitive in frequency to current and temperature variations, but by means of a passive frequency displacement unit. Thus, the critical adjustment of the laser working point is not required.

Further, all variation possibilities in the system, as they are offered by heterodyne systems, are provided. In particular, there are no restrictions for the modulation procedure with respect to analog or digital. Also, instead of a polarization regulator, polarization diversity reception can be performed. Optical amplifiers can be applied at suitable positions in the system, even frequency multiplex operation is possible. The method according to the invention is applicable advantageously, among other applications, for wide-band transmission in subscriber's stations. There, the connection lengths between exchange station and subscriber are short (max. 10 km), and the number of applications to be expected is very high. Therefore, systems of that kind must be simple and economical, which is guaranteed with the system according to the invention, if compared to the known glass-fibre-bound two-laser-heterodyne systems.

It is a further object of the invention to provide a single laser optical communication system which is straightforward in design and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
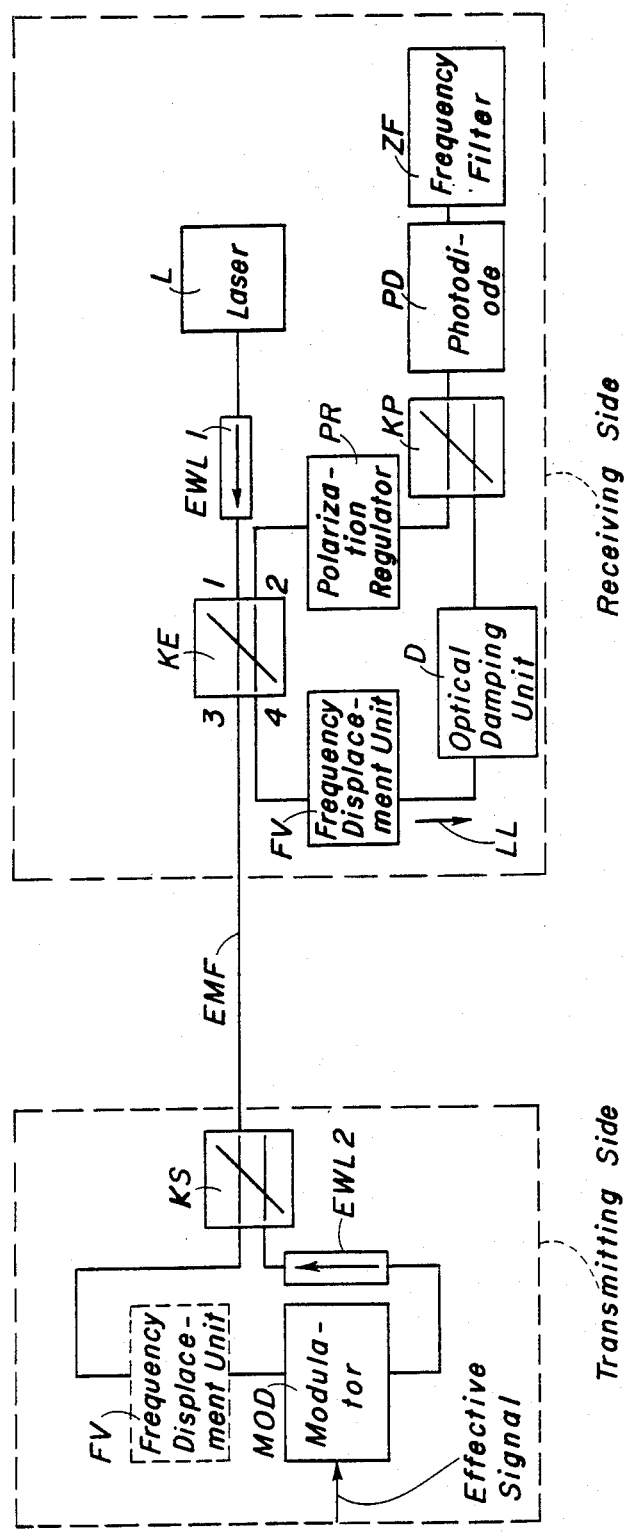
FIG. 1 is a block diagram of a system for optical communication with heterodyne reception, using only one laser and three couplers; and, FIG. 2 is a block diagram of a system for optical communication with heterodyne reception, using only one laser and only one coupler.

Referring to the drawings in particular, the invention comprises a communication system with a transmitting side and a receiving side connected by a single mode fiber designated EMF.

In FIG. 1, the block diagram of a system for optical communication with heterdyne reception, using only one laser L and three couplers KS, KE, KP, is shown.

The laser L transmits a non-modulated optical carrier with a bandwidth of 10 MHz. This carrier travels over a first optical one-way line EWL1. This one way line prevents laser frequency and laser phase fluctuations due to reflected radiation portions. The non-modulated optical carrier is fed in gate 1 of the coupler KE on the receiving side, the coupler acts as a divider in the transmitting side direction, and the non-modulated carrier is distributed to gates 3 and 4. The carrier portion leaving the coupler KE at gate 4 is the local laser wave LL, whereas the carrier portion of the transmitting side leaving at gate 3 is fed over the single-mode fiber EMF. The carrier portion is fed into coupler KS on the transmitting side, alternatively to the frequency displacement on the receiving side at gate 4 of a coupler KE, there may first occur on the transmitting side an optical displacement of frequency by $\Delta f$ in the frequency displacement unit FV subsequently, in the modulator MOD, the optical carrier is modulated with the effective signal.

The second one-way line o the transmitting side EWL2 is necessary, if the carrier portions passing through the modulator MOD and the frequency displacement unit FV in both directions disturb each other. The carrier modulated at the output of the second one-way line EWL2 with the effective signal and being displaced in frequency is transferred over the coupler KS to the one-mode fibre EMF and travels in the direction of the receiving side.

There, in the coupler KE, the modulated signal is coupled over from gate 3 to gate 2, and is fed over a polarization regulator PR. The polarization regulator PR adapts the polarization condition of the modulated optical signal to that of the local laser wave LL. The local laser wave LL, is fed to frequency displacement unit FV and subsequently fed to optical damping unit D so as to be adjusted (if necessary) in its power to optimum receiver sensitivity. The modulated signal is combined with the local laser wave LL in the coupler KP. The mixture and intermediate frequency generation is effected, in the same way as in known methods for other heterodyne systems, in a photodiode PD. A following intermediate frequency filter ZF must be adjusted to the center frequency $\Delta f$, in order that treated ZF signal leaving the filter is fed to the demodulation stage in nearly distortionless condition.

Figure 2:
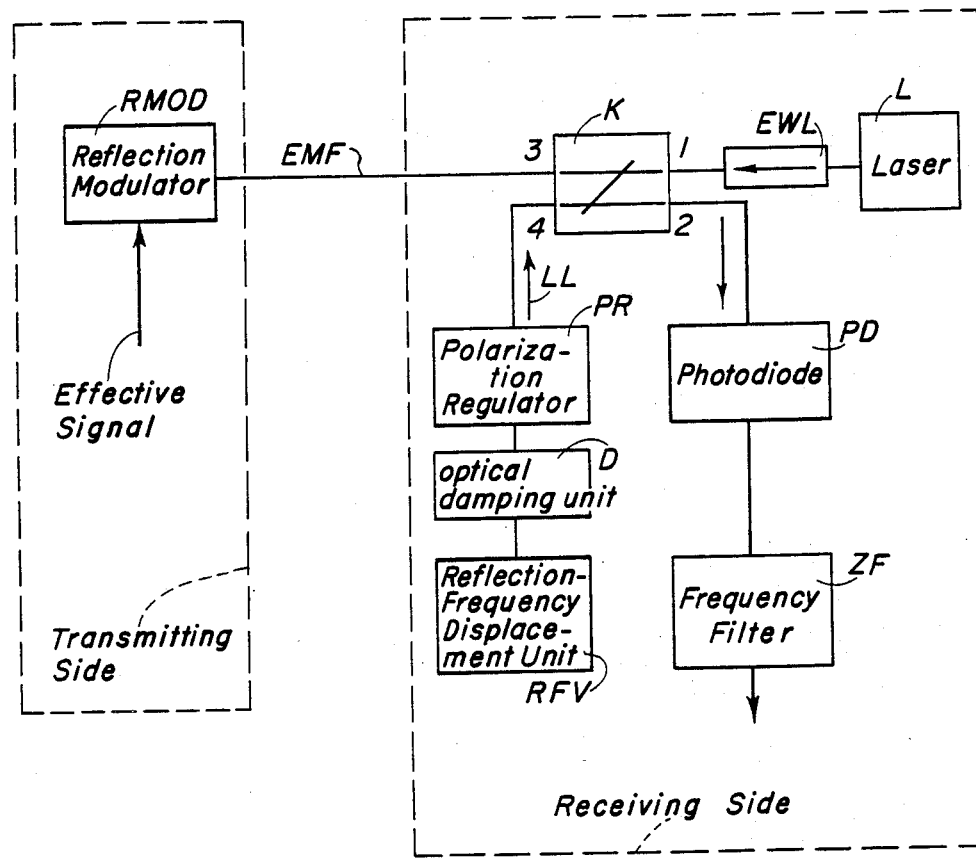

FIG. 2 shows a block diagram of a system for optical communication with heterodyne reception, using only one laser L and one coupler K.

In contrast to the embodiment shown in FIG. 1, in this second embodiment only one 4-gate coupler K is used. The components frequency displacement unit FV and modulator MOD are designed as reflecting components, i.e. as reflexion-frequency displacement unit RFV and reflection modulator RMOD, ie. input and output signal use the same gate, in different directions, however.

The components laser L, one-way line EWL, optical damping unit D, polarization regulator PR, photodiode PD and intermediate frequency filter ZF have the same function as in the embodiment shown in FIG. 1. The non-modulated optical carrier is subdivided in the coupler K. The optical signal leaving at gate 4 is fed to the reflexion-frequency displacement unit RFV over polarization regulator PR and the optical damping unit D and is displaced in its optical frequency by the amount $\Delta f$. This optical signal reaches as local laser wave LL the coupler K again at gate 4, and leaves at gate 2. The portion leaving at gate 1 is blocked by the one-way line EWL. The optical signal leaving at gate 3 of coupler K is transmitted from the transmission path EMF in the direction of the transmitting side, and is there modulated in the reflexion modulator RMOD with the effective signal and travels in this form again through the transmission path EMF, now, however, in reversed direction, in order to enter then into gate 3 of coupler K and to be mixed over gate 2 of coupler K commonly with the local laser wave LL displaced in frequency by the photodiode PD. Further processing takes place as in the embodiment of FIG. 1.

While specific embodiments of the invention have been shown and described in detail to illustrate the application of the principles of the invention, it will be understood that the invention may be embodied otherwise without departing from such principles.

What is claimed is:

1. A method for optical communication of information between a transmitting side and a receiving side spatially separated from each other, using a heterodyne reception principle with one laser only transmitting a non-modulated optical carrier, using at least one fiber-optical coupler arranged on the receiving side comprising the steps of; transmitting the optical carrier, from the one laser, over an optical line; subdividing the optical carrier into two portions including a first and a second portion by directing the optical carrier over the at least one fiber-optical coupler, the first portion being directed to a transmission path of a single-mode fiber and the second portion being directed to form a local laser wave; passing the first portion of the optical carrier through the single-mode fiber in the direction of a transmitting side; displacing the frequency of one of the first portion and second portion of the optical carrier by an amount $\Delta f$; modulating the first portion of the optical carrier at the transmitting side in a modulator, said optical carrier being modulated based on an effective single input into said modulator to produce a modulated optical signal; directing the modulated optical signal back through the single-mode fiber to the receiving side, directing the modulated optical signal over said at least one fiber-optical coupler; combining the optical signal and the local laser wave to form a combined optical signal; and directing the combined optical signal to a photodiode and converting the combined optical signal into an intermediate frequency band with a center frequency equal to $\Delta f$.

2. A method according to claim 1 wherein: the displacement in frequency is carried out on the receiving side.

3. A method according to claim 2, wherein: the displacement in frequency is carried out in a reflection-frequency displacement unit.

4. A method according to claim 1, wherein: the reversal of the signal direction and the coupling of the modulated optical signal into the single-mode fiber on the transmitting side is carried out by means of a second fiber-optical coupler.

5. A method according to claim 4, wherein: the modulator and the second fiber-optical coupler are combined in a reflection modulator.

6. A method according to claim 1, wherein: the two portions of the optical carrier are of identical magnitude.

7. A method according to claim 1, wherein: the single-mode fiber maintains the polarization unchanged.

8. A method according to claim 1, wherein: the displacement in frequency $\Delta f$ is carried out on the transmitting side 9. A method according to claim 1, wherein: the amount $\Delta f$ of the displacement in frequency is adjustable.

10. A system for optical communication of information between a transmitting side and a receiving side spatially separated from each other comprising: a single laser for producing a non-modulated optical carrier arranged on the receiving side; at least one fiber-optical coupler for subdividing the non-modulated optical carrier of the single laser into a first optical carrier portion and a second optical carrier portion; a single-mode fiber transmission path connected to said fiber-optical coupler for receiving said first optical carrier portion, said second optical carrier portion forming a local laser wave at said receiving side; means for directing the first optical carrier portion through the single-mode fiber in the direction of the transmitting side; means for displacing in frequency one of the first optical carrier portion and the second optical carrier portion by an amount $\Delta f$; means for modulating the first optical carrier portion, said means for modulating being located on the transmitting side, said means for modulating receiving an effective signal providing information to form a modulated optical signal, said modulated optical signal being directed to the receiving side over said single-mode fiber means; mixing means for combining the modulated optical signal together with the local laser wave to form a combined optical signal; and, a photodiode for receiving the combined optical signal and a filter for converting the combined optical signal to a frequency band with a center frequency of $\Delta f$.

11. A system according to claim 10, wherein: said means for displacement in frequency is positioned on said receiving side for displacing in frequency the second carrier portion by an amount of Δf.

12. A system according to claim 11, wherein: said means for displacing in frequency includes a reflection-frequency displacement unit.

13. A system according to claim 10, wherein: a second fiber-optical coupler is provided for reversal of the signal direction and the coupling of the modulated optical signal into the single-mode fiber on the transmitting side.

14. A system according to claim 13, wherein: said means for modulating and said second fiber-optical coupler are combined into a single reflection modulator.

15. A system according to claim 10, wherein: the first optical carrier portion and the second optical carrier portion are of identical magnitude.

16. A system according to claim 10, wherein: the single-mode fiber maintains the polarization unchanged.

17. A system according to claim 10, wherein: the displacement in frequency Δf is adjustable.

* * * * *